United States Patent [19]

Quintero

[11] Patent Number: 5,635,818
[45] Date of Patent: Jun. 3, 1997

[54] SAFETY JUMPER APPARATUS

[76] Inventor: Leodegario M. Quintero, 13715 Greywood Dr., Sugarland, Tex. 77478

[21] Appl. No.: 603,218

[22] Filed: Feb. 20, 1996

[51] Int. Cl.[6] .................................................. H02J 7/00
[52] U.S. Cl. ....................................... 320/25; 320/2
[58] Field of Search ..................... 320/2, 25; 439/188, 439/217, 218, 223

[56] References Cited

U.S. PATENT DOCUMENTS

| | | | |
|---|---|---|---|
| 3,466,453 | 9/1969 | Greenberg | 320/25 X |
| 3,936,121 | 2/1976 | Leinberger . | |
| 3,942,027 | 3/1976 | Fima . | |
| 4,163,134 | 7/1979 | Budrose . | |
| 4,166,241 | 8/1979 | Grant . | |
| 4,180,746 | 12/1979 | Giuffra . | |
| 4,185,204 | 1/1980 | Fima . | |
| 4,238,722 | 12/1980 | Ford . | |
| 4,258,305 | 3/1981 | Anglin | 320/2 |
| 4,286,172 | 8/1981 | Millonzi et al. . | |
| 4,349,774 | 9/1982 | Farque . | |
| 4,355,275 | 10/1982 | Anglin | 320/25 X |
| 4,431,925 | 2/1984 | Frisbee et al. . | |
| 4,488,147 | 12/1984 | Signorile . | |
| 4,527,111 | 7/1985 | Branham . | |
| 4,769,586 | 9/1988 | Kazmierowicz . | |
| 4,840,583 | 6/1989 | Moore . | |
| 4,906,205 | 3/1990 | Viles . | |
| 4,938,712 | 7/1990 | Black . | |
| 4,969,834 | 11/1990 | Johnson | 429/141 |
| 4,972,135 | 11/1990 | Bates et al. . | |
| 5,111,130 | 5/1992 | Bates . | |
| 5,167,529 | 12/1992 | Verge . | |
| 5,180,310 | 1/1993 | Miller . | |
| 5,189,359 | 2/1993 | Kronberg . | |
| 5,230,637 | 7/1993 | Weber . | |
| 5,297,977 | 3/1994 | Lamper . | |
| 5,511,986 | 4/1996 | Casey et al. | 439/188 |

*Primary Examiner*—Peter S. Wong
*Assistant Examiner*—Patrick B. Law

[57] ABSTRACT

An apparatus for safely connecting the batteries of two vehicles to jump start one of the vehicle engines. Safety is achieved by three means: 1) The location for making the connection is removed from the vicinity of the battery. The remote connector eliminates the potential for ignition of battery-generated gasses and also the potential for other accidents associated with open vehicle engine compartments. 2) The connector itself is designed so that the connection can be made in only one way, positive to positive and negative to negative, eliminating the possibility of reversing polarity and the resulting damage to personnel and to vehicles. 3) The connector is easy to use and inexpensive to manufacture because of unitized construction; positive and negative contact surfaces are included in each connector half.

9 Claims, 2 Drawing Sheets

5,635,818

SAFETY JUMPER APPARATUS

BACKGROUND OF THE INVENTION

1. Field of the Invention

The present invention relates to motorized vehicles which are equipped with batteries for engine starting and specifically to a safe apparatus for connecting a vehicle battery to another battery.

The batteries normally found in automobiles and other vehicles can generate combustible and explosive gasses. The gasses can be ignited by the sparks which often occur when a weak battery is connected to a stronger battery by jumper cables. Most automobile owner's manuals contain instructions for making the jump more safely by completing the jump circuit to ground, not to the negative battery post. In practice this advice is usually not followed.

An even more hazardous situation is created if the jumper cables are crossed; i.e., the positive terminal of one battery connected to the negative terminal of the other and vice versa. A resulting explosion can eject battery acid onto personnel, causing serious injury. Many such accidents have occured. In addition to potential human injury, components of the vehicle alternator and distributor can be destroyed.

Use of the present invention will make it easy to connect the battery of one vehicle to the battery of another vehicle without producing sparks in the vicinity of either battery and without the possible of reversing the polarity.

2. Prior Art

Previosly patented means of overcoming the hazards of jumpering batteries can be divided into the four catagories described below. Following each of the four catagories are the numbers of one or more patents which exemplify the means described. Several prior patents have incorporated two or three of the four means.

A. Remote Terminals: Positive and negative battery terminals are permanently connected to a corresponding pair of terminals at a safe distance from the battery. Conventional jumper cables with clamps can be connected to these remote terminals. There is then little chance that resulting sparks will ignite battery gasses. 3942027, 4185204.

B. Keyed or Coded Connectors: The potential for crossing the jumper cables is minimized by having cable clamps keyed to battery posts or by using an intermediate junction box with polarity keying or coding. 4349774, 5167529.

C. In-line Jumper Cable Switches: A manual or electrically activated switch is placed in line with one or both cables. After the cables are attached to the batteries and correct polarity verified, switch or switches are closed to complete the circuit. The potential for spark ignition of battery gasses is minimized if switches are located at sufficient distance from batteries or if switches are enclosed in sealed containers to protect them from atmosphere. 4163134, 4166241, 4180746, 4238722, 4286172, 4431925, 4527111, 4906205, 4972135, 5180310, 5189359, 5297977.

D. Visual Polarity Indicators: Light emitting diodes and other visual devices are employed to assist the user of jumper cables to make battery connections with the correct polarity. One proposed system uses an audible alarm. Typically these indicators are use in conjunction with switches, relays, or diodes to achieve a safer jumper system. 3936121, 4488147, 4769586, 4840583, 4938712, 4969834, 5111130, 5189359, 5230637.

The abundance of prior art attests the continuing and pressing need for safety in battery jump starts. However, not one of the previously patented means has found its way into common usage. After millions of dangerous jumps over the course of about eighty years and after thousands of serious injuries, we continue to use the most primitive system. Why? Because of cost and convenience. For a safe apparatus to be adopted, it must be easy to use and inexpensive. It should not be much more expensive than the conventional jumper cables with alligator clamps. The present invention is not only effective but also answers the problems of cost and convenience.

SUMMARY OF THE INVENTION

The principal objective of the present invention is to provide a safe system for jumpering a functioning automobile battery to another automobile battery which is so weak that it cannot be used to start the engine. But no safety system can be effective unless it is used. Thus a secondary objective is to provide a system which will be accepted by automobile drivers, mechanics, and manufacturers. To be accepted it must be functional, low-cost, and easy to use.

Most of the serious injuries which result from the use of conventional jumper cables are caused by the ignition of gasses generated by one of the batteries. The gasses are ignited by an electric arc drawn between a battery terminal (post) and a jumper cable clamp when the charging circuit is completed. Ignition of the gasses can cause acid to burst from the battery onto people and the automobile. A situation even more dangerous to people and to automobile electric systems is created when the jumper cables are accidentally crossed, reversing the polarity, shorting one battery to another.

Thus the two causes of injury and damage are: (1) Sparks near either battery and (2) Failure to maintain correct polarity. The first cause is eliminated in the present invention by making the jump connections at locations safely distant from the batteries. The second cause is eliminated by the connectors themselves. The permanently mounted receptacle in each vehicle is designed to fit the plug at each end of the jumper cable in only one way; the physical configurations of the plug and matching receptacle prevent reversing of the polarity.

Simplicity of design makes plug and receptacle inexpensive to manufacture and easy to use. Both plug and receptacle are unitized (positive and negative contact surfaces are present in each). People who are not familiar with the technology or the dangers of battery jumpering can use the system safely and easily. Likewise, many people who lack the physical strength to use conventional jumper cables can complete the jump with the present system. If the receptacles are located in the vehicle passenger compartments, a jump can be made without some of the inconvenience and danger associated with inclement weather, darkness, and opening the engine cover.

BRIEF DESCRIPTION OF THE DRAWINGS

In the following descriptions, the terms "plug" (male) and "receptacle" (female) are used only to distinguish between the two halves of a complete connector or connection. They should not be interpreted to limit the design possibilities.

DETAILED DESCRIPTION

Figure 1:
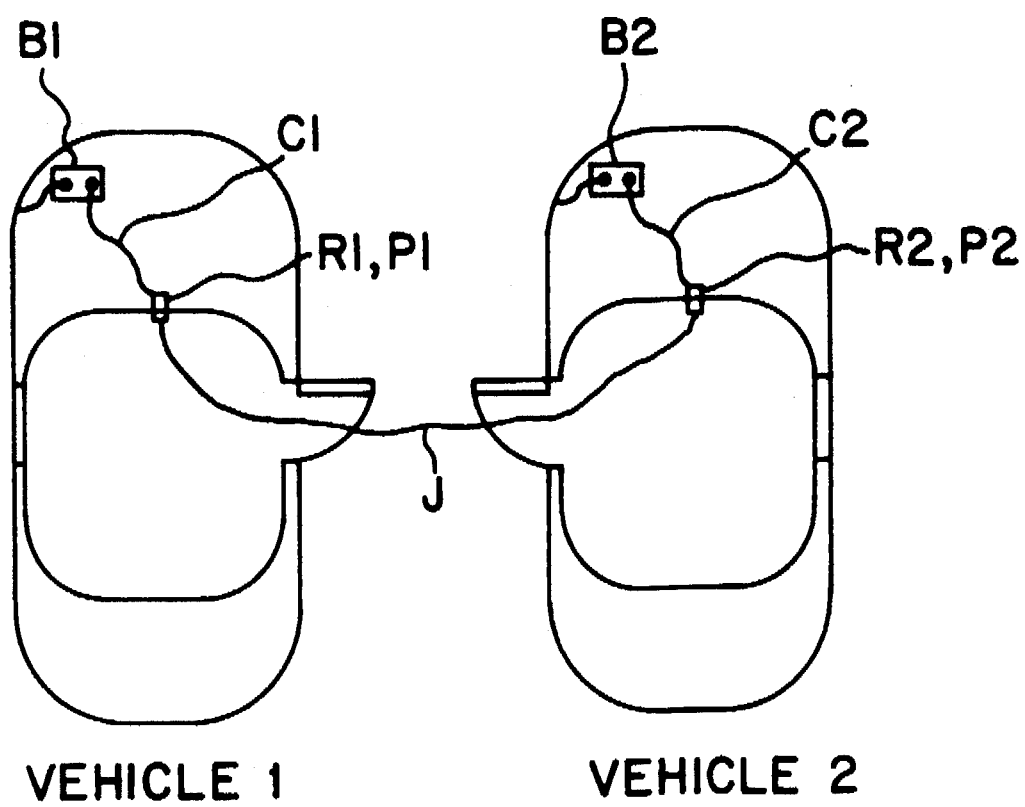
FIG. 1 illustrates the entire circuit, showing two vehicles with batteries, the permanently mounted cables, and the jumper cable with a plug on each end.

As shown in the simplified vehicle drawings, the two batteries B1 and B2 have negative terminals permanently connected to the vehicle chassis and positive terminals permanently connected via cables C1 and C2 to jumper receptacles R1 and R2. This conforms to the usual practice of negative grounding. In the rare case of positive grounding, the polarities of this description would be reversed.

A receptacle R is permanently installed in each vehicle and has positive 4 and negative 5 contact surfaces connected, directly or indirectly, to the corresponding terminals of the vehicle battery B. A plug P, permanently installed on each end of jumper cable J, having positive 2 and negative 3 contact surfaces connected to positive and negative conductors of the cable J, is designed to mate with the corresponding contact surfaces 4 and 5 of the receptacle R such that the electrical path between the two vehicular batteries is correctly completed.

The plug P and receptacle R are each of unitized construction such that both positive 2 & 4 and negative 3 & 5 contact surfaces are present in each. The plug P and receptacle R are designed to join in only one way, positive to positive and negative to negative, preventing accidental reversal of polarity.

The receptacle R could be mounted anywhere on the inside or outside of a vehicle if the vehicular location of the receptacle R is sufficiently distant from the battery to virtually eliminate the possibility of spark ignition of gasses generated by the battery. For this description, the receptacle R replaces the cigarette lighter receptacle in the vehicle dashboard and functions as a jumper receptacle as well as a receptacle for the cigarette lighter assembly. The jumper cable J, with identical plugs P permanently installed on each end, is routed through an open door of each vehicle and attached to the identical receptacles R.

The recommended procedure for making a safe jump with the present invention is:

1) Bring the two vehicles close enough to one another that the jumper cable J will easily reach from one receptacle R1 to the other R2;
2) Set the parking brake firmly on each vehicle;
3) Turn off engines and accessories (lights, fans, radios, etc.)
4) Open one door of each vehicle and lay the jumper cable J in position to make the connections;
5) Fully insert plug connectors P1 & P2 into receptacle connectors R1 & R2;
6) Start the engine of the vehicle having a charged battery B1;
7) Start the engine of the vehicle having a discharged battery B2; if it does not start immediately, check connections, wait five minutes with the other engine running, and try again;
8) Remove the jumper cable J with plugs P1 and P2.

Figure 2:
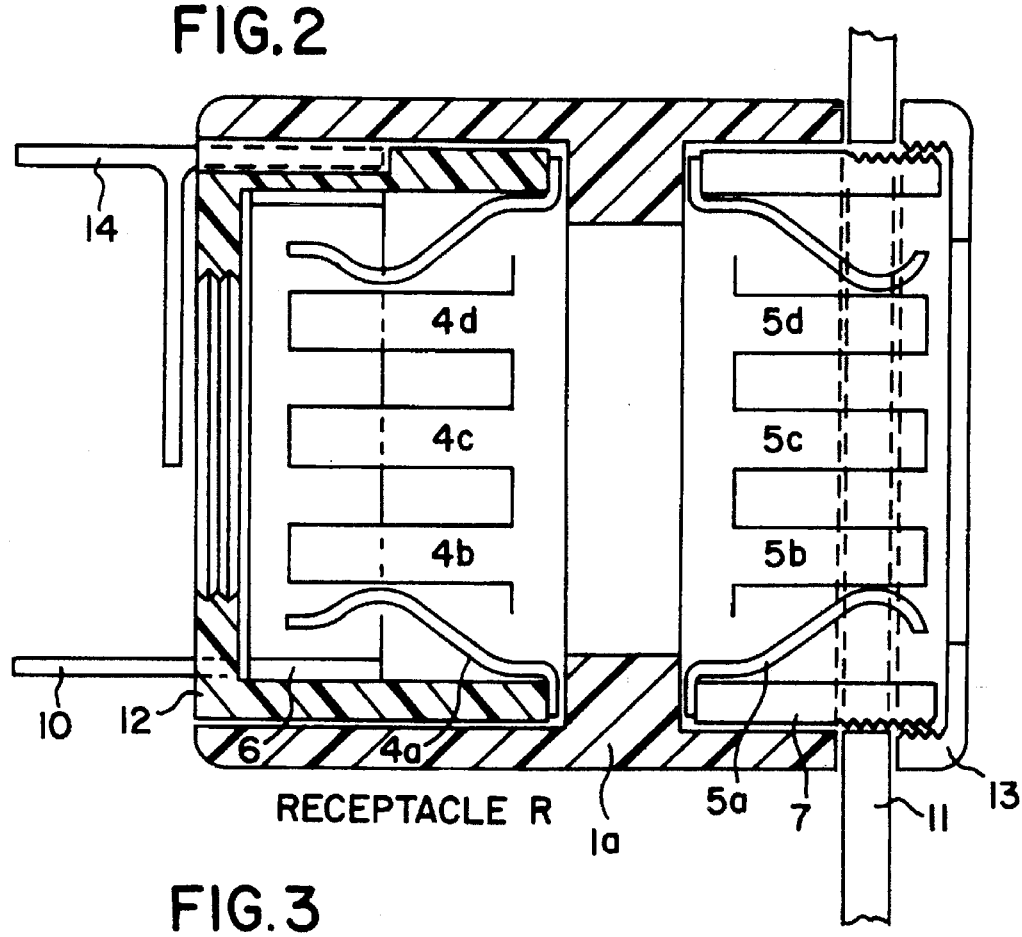
FIG. 2 is a cross-section of the vehicle-mounted receptacle.
Figure 3:
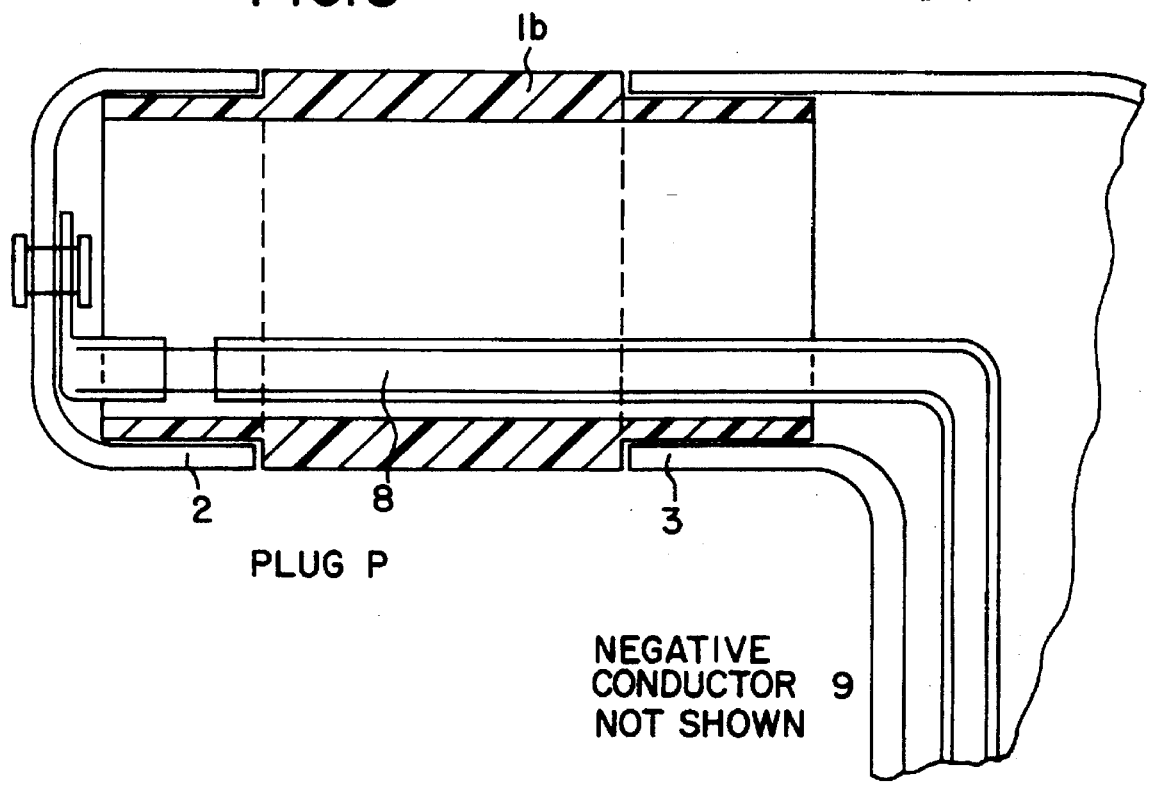
FIG. 3 is a cross-section of the plug attached to each end of the jumper cable.

The complete high-amperage electrical connector, including receptacle R (female) and plug P (male) connector halves, suitable for joining two vehicular batteries to jump start one of the vehicular engines is described is greater detail below. Referring to FIGS. 2 and 3, the supporting structure 1 for both plug P and receptacle R is an insulating material, preferably high-temperature plastic. Electrical contact surfaces 2, 3, 4, 5, and 6, in this embodiment, are formed from metal tubing. Metal surfaces 2, 4, and 6 are the positive elements. Surface 2 in the plug P is connected to the positive conductor 8 of the jumper cable J; metal surface 6 in the receptacle R is attached to positive terminal 10 which is connected to the positive battery terminal.

Electrical contact surfaces 4 and 5 of the receptacle R are designed to flex open as the plug P is inserted and then return to their original shape when the plug P is removed. The plug P fits easily into the receptacle R and has concentric positive 2 and negative 3 contact surfaces providing high contact area with the corresponding surfaces 4 and 5 of the receptacle R. The receptacle R contains concentric positive 4 and negative 5 contact surfaces which exert firm pressure by spring action on the corresponding surfaces 2 and 3 of the plug P. This spring action is achieved by compression forming of the hot alloy tube. The tubes are also slotted to permit movement of each spring leaf 4a, 4b, 4c, etc. As the positive surface 2 of the plug P enters the slotted tube 4 making contact and continuing inward, the leaves 4a, 4b, 4c, etc. are pushed back into contact with the metal ring 6, thus completing the circuit. The positive housing 12 is made from an insulating material, high-temperature plastic in this embodiment.

The reason for the gap between the spring leaves of tube 4 and the conductive ring 6 is safety. If tube 4 were directly connected to the battery and if someone were to probe the receptacle with a screwdriver, e.g., an electrical short could occur between positive and negative spring leaves 4 & 5, causing damage to the receptacle R and the battery. Therefore there is this concealed switch 4, 6 in receptacle R which closes and thus completes the circuit when plug P is inserted but protects the receptacle from accidental shorting when plug P is not inserted.

The negative housing 7 is made from metal pipe. The receptacle R is secured to the vehicle dashboard by a bezel nut 13. Electrical path to ground is obtained by good electrical contact between components 5, 7, 11, and 13. If the vehicle dashboard 11 is not conductive, then, of course, a ground cable would be attached to the negative housing 7. The negative conductor 9 of the jumper cable J is attached to the negative contact surface 3 of the plug P near the bottom of the handle portion.

Receptacle R is designed to accomodate typical automobile cigarette lighter assemblies as well as the plug P. The typical cigarette lighter assembly is somewhat less than an inch in diameter and screws into its dashboard receptacle. The plug P is somewhat more than an inch in diameter so that it will activate the switch 4, 6. When the lighter assembly is installed in the receptacle R, it does not open contact surface 4 far enough to reach the positive metal ring 6; it screws into the threaded portion of the positive housing 12 and finds its route to the positive battery terminal via contact with metal arm and terminal 14.

The lighter requires much lower amperage than a jump start so it is protected by a fuse in the automobile fuse panel whereas the jumper receptacle R is protected by the concealed switch 6, 4. When it is necessary to make a jump, the lighter asssembly is screwed out of the receptacle R and the plug P is pushed into it. The end of plug P cannot reach the terminal arm 14 because it is stopped by the threaded portion of the positive housing 12.

From the foregoing description, it can be seen that one vehicle can be started safely from another with a jumper system that is inexpensive and easy to use. Electrical connections are made at a safe distance from the battery and, in this preferred embodiment, in the passenger compartment where personnel are partially protected from the adverse effects of weather, darkness, and crime. It is not necessary to open the engine compartment of either vehicle, thus avoiding the danger of hot and/or rotating engine components. The same dashboard receptacle R can be used for charging the battery. Because of the physical configurations of plug P and the receptacle R, it is not possible to accidently reverse polarity as can be done with conventional jumper cables.

It is apparant that the stated goals of the invention have been reached along with additional benefits. The foregoing description of the preferred embodiment of the invention has been presented for purposes of illustration and description. It is not intended to be exhaustive or to limit the invention to the precise form disclosed. Many modifications and variations are possible in light of the above teaching.

What is claimed is:

1. An apparatus for safely jumpering one vehicular battery to a second vehicular battery, comprising:
    a first receptacle connector installed in a first vehicle having positive and negative contact surfaces connected to positive and negative terminals of said one vehicular battery, respectively;
    a second receptacle connector installed in a second vehicle having positive and negative contact surfaces connected to positive and negative terminals of said second vehicular battery, respectively;
    a cable to connect said first and second receptacle connectors containing positive and negative conductors having a plug connector at each end of the cable, each plug connector having positive and negative contact surfaces connected to said positive and negative conductors of said cable and adapted to mate with said positive and negative contact surfaces of said first and second connector receptacles, respectively, whereby an electrical path between the batteries is completed such that the positive and negative terminals of said one vehicular battery are connected to the positive and negative terminals of said second vehicular battery, respectively, and;
    said first and second receptacle connectors including switching means to prevent accidental shorting between said positive and negative contact surfaces connected to said positive and negative terminals of said vehicular batteries.

2. An apparatus for safely jumpering one vehicular battery to a second vehicular battery according to claim 1 wherein said switching means includes:
    a metal ring within said receptacle connector;
    said metal ring connected to said positive terminal of said vehicular battery;
    a plurality of spring leaves adjacent said metal ring of said receptacle connectors, and;
    said spring leaves contacting said metal ring and establishing an electrical path between said positive terminal of said one vehicular battery and said positive terminal of said second vehicular battery when said plugs of said cable are inserted into said receptacle connectors.

3. An apparatus for safely jumpering one vehicular battery to a second vehicular battery according to claim 2 wherein said receptacle connectors further include;
    a terminal arm within said receptacle connectors;
    said terminal arm connected to said positive terminal of said vehicular batteries, and;
    said terminal arm positioned within said receptacle connector to receive a cigarette lighter assembly and allow operation of said cigarette lighter assembly without engaging said switching means.

4. An apparatus for safely jumpering one vehicular battery to a second vehicular battery according to claim 3 wherein:
    said receptacle connector receives said cigarette lighter assembly by threaded engagement.

5. An apparatus for safely jump starting a first vehicle with a discharged battery using a second vehicle with a charged battery, comprising:
    a first receptacle connector installed in a first vehicle having positive and negative contact surfaces connected to positive and negative terminals of said discharged battery, respectively;
    a second receptable connector installed in a second vehicle having positive and negative contact surfaces connected to positive and negative terminals of said charged battery, respectively;
    a cable to connect said first and second receptacle connectors containing positive and negative conductors having a plug connector at each end of the cable, each plug connector having positive and negative contact surfaces connected to said positive and negative conductors of said cable and adapted to mate with said positive and negative contact surfaces of said first and second connector receptacles, respectively, whereby an electrical path between the charged and discharged batteries is completed such that the positive and negative terminals of said charged battery are connected to the positive and negative terminals of said discharged battery, respectively, and;
    said first and second receptacle connectors including polarity protection means to prevent accidental shorting between said positive and negative contact surfaces connected to said positive and negative terminals of said charged and discharged batteries.

6. An apparatus for safely jump starting a first vehicle with a discharged battery using a second vehicle with a charged battery according to claim 5, wherein
    said first receptacle connector installed in said first vehicle is remotely located from said discharged battery within said first vehicle to minimize the potential for ignition of battery generated gases, and;
    said second receptacle connector installed in said second vehicle is remotely located from said charged battery to minimize the potential for ignition of battery generated gases.

7. An apparatus for safely jump starting a first vehicle with a discharged battery using a second vehicle with a charged battery according to claim 6 wherein said polarity protection means includes:
    a metal ring within said receptacle connector;
    said metal ring connected to said positive terminal of said vehicle battery;

a plurality of spring leaves adjacent said metal ring of said receptacle connector, and;

said spring leaves contacting said metal ring and establishing an electrical path between said positive terminal of said discharged battery and said positive terminal of said charged battery when said plugs of said cable are inserted into said receptacle connectors.

8. An apparatus for safely jump starting a first vehicle with a discharged battery using a second vehicle with a charged according to claim 7 wherein said receptacle connectors further include:

a terminal arm within said receptacle connectors;

said terminal arm connected to said positive terminal of said vehicle battery, and;

said terminal arm positioned within said receptacle connector to receive a cigarette lighter assembly and allow operation of said cigarette lighter assembly without engaging said polarity protection means.

9. An apparatus for for safely jump starting a first vehicle with a discharged battery using a second vehicle with a charged battery according to claim 8 wherein:

said receptacle connector receives said cigarette lighter assembly by threaded engagement.

* * * * *